G. A. LOWRY.
SHREDDING AND SPINNING MACHINE.
APPLICATION FILED MAR. 12, 1914.

1,291,955.

Patented Jan. 21, 1919.
6 SHEETS—SHEET 1.

G. A. LOWRY.
SHREDDING AND SPINNING MACHINE.
APPLICATION FILED MAR. 12, 1914.

1,291,955.

Patented Jan. 21, 1919.
6 SHEETS—SHEET 3.

Witnesses:
C. W. Benjamin
W. C. Darby

Inventor
George A. Lowry
By his Attorney
Samuel E. Darby

G. A. LOWRY.
SHREDDING AND SPINNING MACHINE.
APPLICATION FILED MAR. 12, 1914.

1,291,955.

Patented Jan. 21, 1919.
6 SHEETS—SHEET 6.

Witnesses:

Inventor
George A. Lowry
By his Attorney
Samuel E. Darby

UNITED STATES PATENT OFFICE.

GEORGE A. LOWRY, OF NEW YORK, N. Y., ASSIGNOR, BY MESNE ASSIGNMENTS, TO A. BLAIR RIDINGTON.

SHREDDING AND SPINNING MACHINE.

1,291,955.      Specification of Letters Patent.      Patented Jan. 21, 1919.

Application filed March 12, 1914. Serial No. 824,136.

*To all whom it may concern:*

Be it known that I, GEORGE A. LOWRY, a citizen of the United States, residing in the city, county, and State of New York, have made a certain new and useful Invention in Shredding and Spinning Machines, of which the following is a specification.

This invention relates to machines for shredding palmetto or palm leaves or other material and spinning the same into twine.

The object of the invention is to provide a machine which is simple in construction and efficient in operation for shredding palmetto or palm leaves, and the like and spinning the shredding product into twine.

The invention consists substantially in the construction, combination, location and relative arrangement of parts all as will be more fully hereinafter set forth, as shown in the accompanying drawings, and finally pointed out in the appended claims.

Referring to the accompanying drawings,—

Fig. 7, is a similar view showing the parts as in Fig. 6 but looking in the opposite direction.

The same part is designated by the same reference numeral, wherever it occurs throughout the several views.

Figures 1, 4, 5, 6:
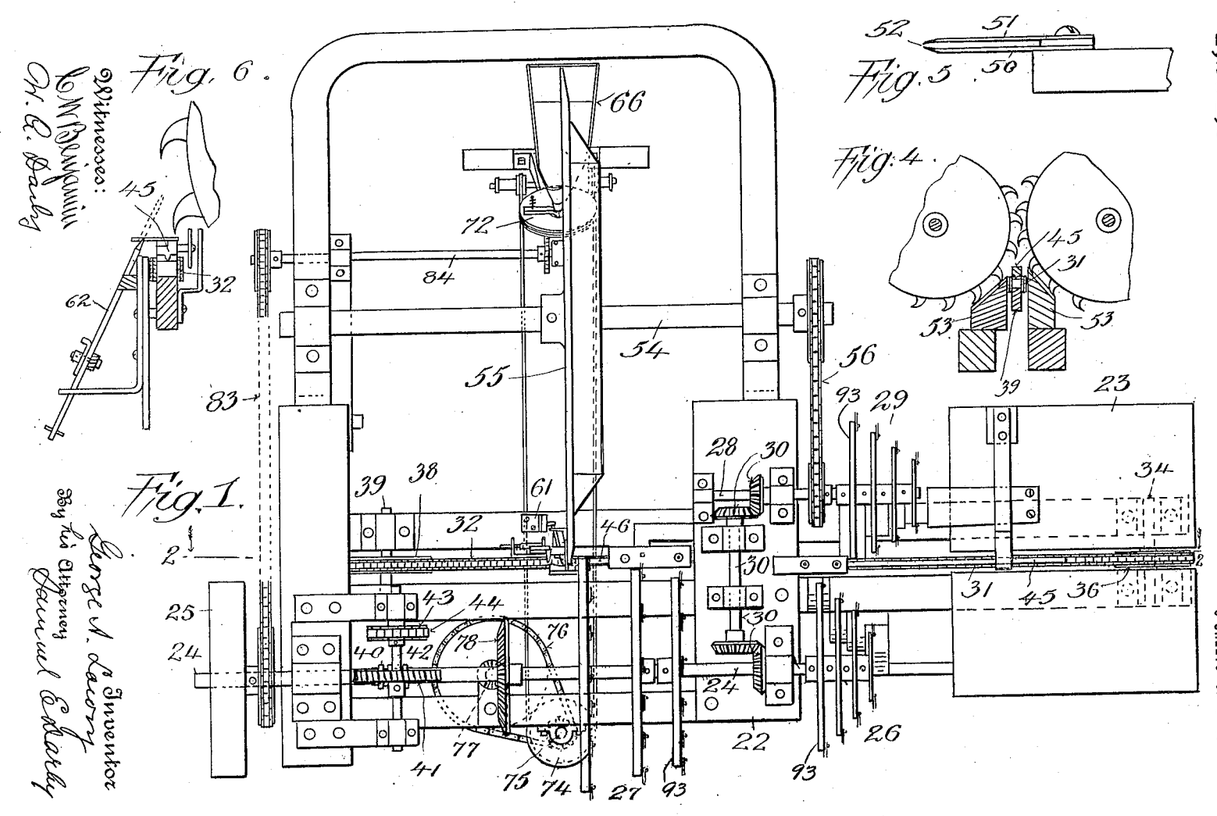
Figure 1 is a view in top plan of a shredding and spinning machine embodying the principles of my invention.
Fig. 4 is a broken detail view in transverse section showing the relation of the shredding devices on opposite sides of a conveyer, and means for supporting the leaf or other article to be shredded against the action of the shredding devices.
Fig. 5 is a broken detail view in top plan showing a pair of shredding cutters.
Fig. 6 is a broken detail view in transverse section, showing the operation of a portion of the selector mechanism for the shredded material.
Figure 21:
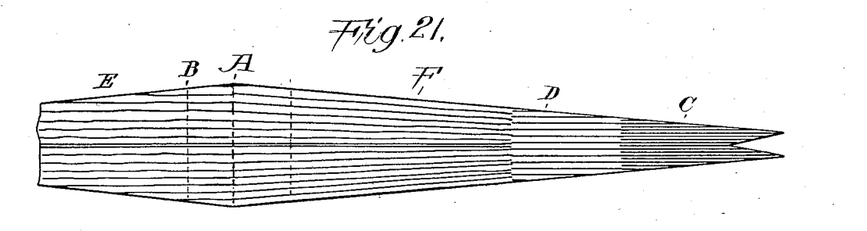
Fig. 21 is a view showing a leaf of the palmetto or palm, and illustrating the shredding operation.

The leaves of the palmetto or palm trees which grow luxuriantly in Florida and other places in this and in tropical countries, are capable of being shredded or divided into fibers or slivers which are strong and easily spun into twine for use in various ways, and for the various purposes for which twine is adapted, such, for instance, as binder twine, matting, bagging and the like. The availability of such leaves, and in great abundance, at practically all seasons of the year, makes the production of machinery for shredding and spinning the same, an attractive business proposition. By reason of the peculiar formation of the leaves, it is necessary to shred them in a particular way in order to secure the best results. In Fig. 21 I have shown a typical leaf and have indicated the manner of properly shredding the same. It will be observed that the leaf is of substantially elongated diamond shape with the point of greatest width at approximately the mid-length, as indicated at A, and tapering from this mid-length point toward its ends. The leaf is built up in lines which extend longitudinally. The fiber lines of the leaf extend in general parallel relation to the side edges of the leaf from the mid length point A of the leaf toward one end as indicated at F, and consequently in general converging relation to each other, that is, converging toward each other at the extreme outer end of the leaf. On the other side of the mid line A, these fiber lines extend in general parallel relation to each other, but not to the side edges of the leaf as indicated at E. I have found that if it is attempted to slice or shred the leaf from end to end along parallel lines, the shredded portions are of unequal width due to the peculiar diamond shaped outline of the leaf. I have also found that any attempt to slice or shred the leaf at one stroke of a slicing or shredding device or even one half or somewhat less, of the length of the leaf results in cutting off or breaking off the leaf or the slivers, and therefore, I have found it necessary to clamp or hold the leaf at, or in the region of, its mid length and then, by the action of successively acting shredding devices, slice or shred the leaf for a small portion only of its length measured from one of its extreme ends, as indicated at C, Fig. 21 and then for another portion of its length extending toward its clamped region, and by cutters preferably arranged in staggered relation with reference to the cut of the first set of cutters as indicated at D, and so on for successive cuts, until the entire length of the leaf on one side of the clamp or holder is shredded. I then, in accordance with my invention, transfer the partly shredded leaf to another clamp or holding device which is applied to the previously shredded portion and repeat the same progressive shredding operation on the other end of the leaf, thereby effecting the complete shredding of the leaf from end to end.

In carrying out this part of my invention, I provide suitable shredding or slicing devices and transport or convey the leaves successively therepast, the shredding cutters being placed at one side of the conveyer and operating transversely to the line of feed thereof, the leaves lying transversely of the conveyer and clamped or held thereto at the mid-point or region thereof, thereby enabling the shredding cutters to operate in the direction of the length of the leaves. After the leaf has thus been shredded at one end it is transferred to another conveyer which, as above indicated, clamps or engages the previously shredded portion and conveys the unshredded portion past similar shredding cutters similarly arranged and positioned on the opposite side of the second conveyer which complete the shredding of the leaf. The resulting product is a mass of finely divided long slivers or fibers well adapted for spinning into twine. I also propose, in accordance with my invention, to provide means which are simple and efficient for dividing and selecting the fibers, and in sufficient successive quantities which are seized by nippers and transferred from the conveyers above referred to, and transported and delivered to the spinning devices by means of which they are formed into twine, and from which the twine is delivered in finished form.

It is among the special purposes of my invention to provide means which are simple in construction and efficient in operation for accomplishing the various operations referred to, and others to be more specifically hereinafter referred to.

It is also among the special objects of my invention to combine the shredding and spinning devices into a coöperative self contained machine capable of receiving the leaves, shredding the same, spinning the shredded product into twine, and trimming and delivering the finished twine product.

In the accompanying drawings wherein I have shown, as an exemplification of my invention, one form of mechanism for carrying out the operations above described, 22, designates a suitable frame work for supporting the various operating parts of the machine, and which framework supports a receiving table 23, upon which the leaves are placed preparatory to introducing them to the conveyer mechanism. In the framework is mounted a main drive shaft 24, adapted to receive rotation from any suitable or convenient source, as, for instance, through a drive pulley 25. From this main shaft, the various operating parts of the machine are driven. If desired, and as shown, but to which my invention is not to be limited or restricted, the shaft 24 may serve also as a revolving support for the sets of shredding or slicing devices indicated generally by reference numerals 26, 27, which are arranged at one side of the conveyer mechanism, and which operate on one end of the leaf to be shredded. In the framework is mounted a shaft 28, see Fig. 1, upon which are mounted the shredding devices or slicers indicated generally by reference numeral 29. This shaft 28 is arranged, in the particular form shown, in parallel relation to shaft 24, but is positioned on the opposite side of the conveyer mechanism, to enable the shredders 29 to act upon the opposite ends of the leaves from the ends thereof which are acted upon by the shredders 26, 27. The shaft 28, may be driven in any suitable or convenient manner. In the combined and self contained organized machine shown as embodying my invention, this shaft 28, is driven from main shaft 24, by means of gearing 30, intermediate said shafts.

Figures 1, 2:
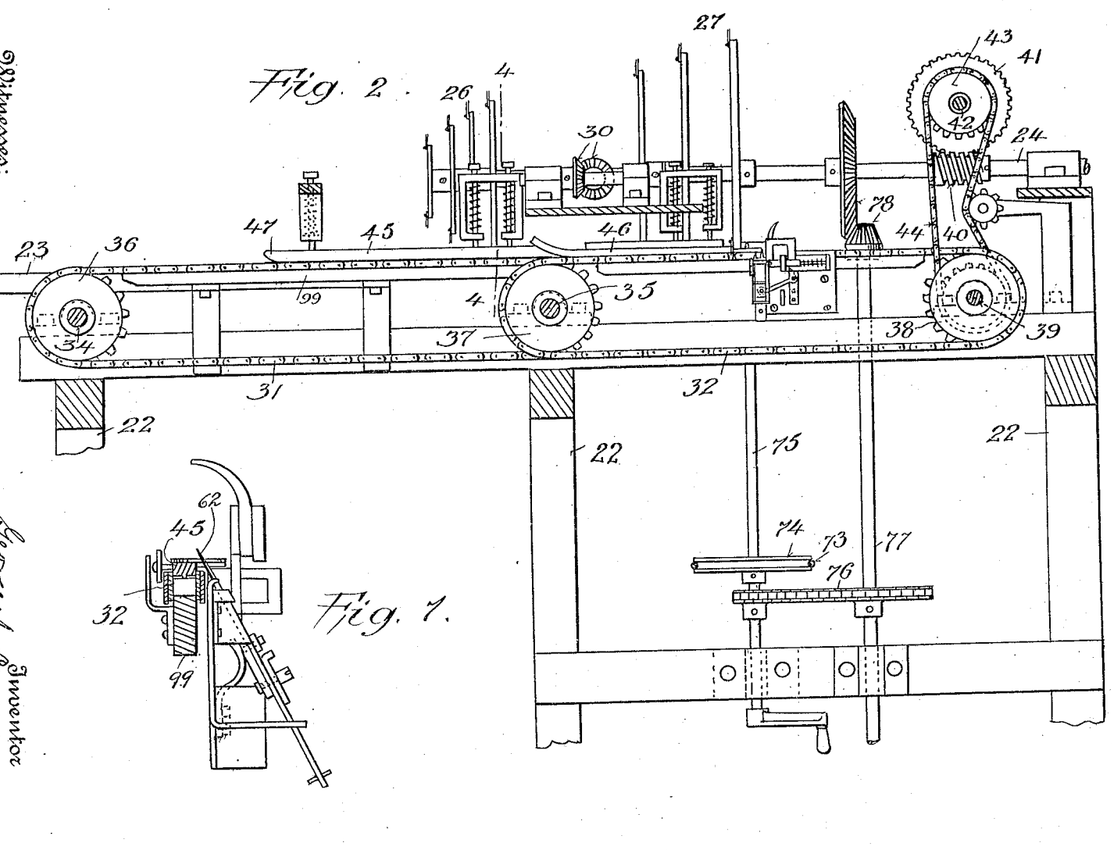
Fig. 2 is a vertical central longitudinal section on the line 2, 2, Fig. 1 looking in the direction of the arrows.
Figures 10, 11, 12, 13, 14, 15:
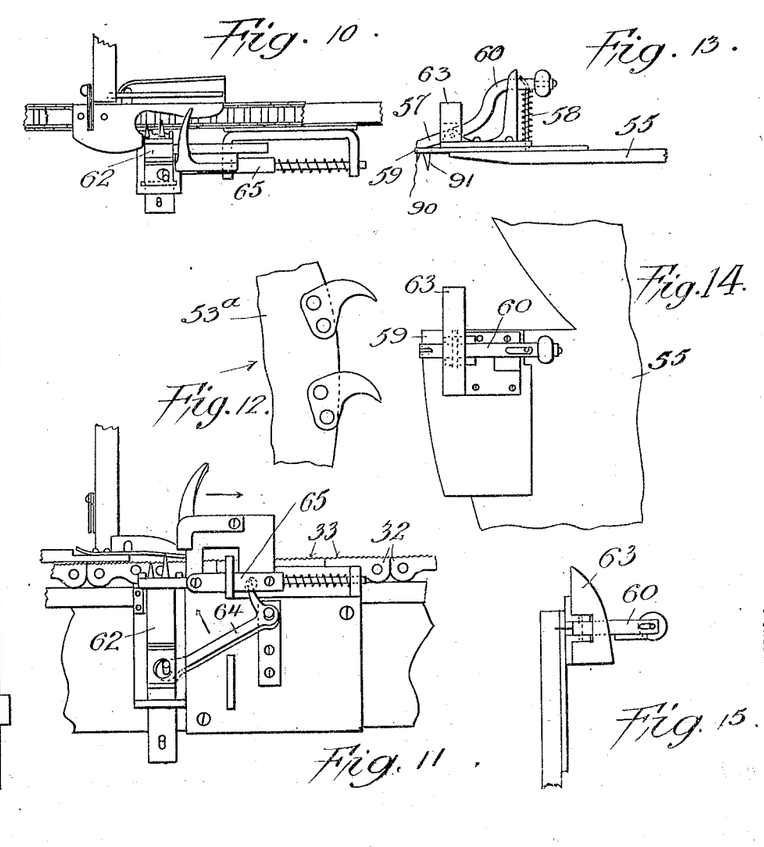
Fig. 10 is a broken detail view in top plan of the selector mechanism.
Fig. 11 is a similar view in elevation of the construction shown in Fig. 10.
Fig. 12 is a broken detail view in side elevation of a shredding cutter device.
Figs. 13, 14 and 15, are broken detail views of a portion of the feed wheel showing a nipper device.

The conveyer mechanism which I have shown as one embodiment of my invention includes two sets of endless linked chains, one, indicated at 31, and the other indicated at 32. These conveyer chains are arranged to operate in planes parallel to each other, the chain 31, operating to feed the leaves to be shredded past the shredders 29, while the chain 32 effects the feed of the leaves past the shredders 26, 27, although, as indicated in Fig. 1, the shredders 26 may operate on the extreme ends of the leaves while said leaves are being fed by the conveyer 31. Preferably the surface of the conveyer links which engages the leaves are slightly corrugated or serrated, as indicated at 33, Fig. 11, to insure an efficient gripping action on the leaves. The conveyer 31, operates over sprocket wheels respectively carried by shafts 34, 35, one of said sprocket wheels being shown at 36, Figs. 1 and 2. The other conveyer 32, operates over sprocket wheels 37, 38, carried, respectively, by shafts 35 and 39. The conveyer chains may be driven and operated in any suitable and convenient manner. In the complete organized machine embodying my invention I have shown a simple drive gearing for the conveyers wherein such drive is accomplished from the main drive shaft 24, of the machine through a worm gear 40, thereon which meshes with and drives a gear 41 on a shaft 42, upon which is mounted a sprocket wheel 43. A sprocket chain 44, operates over the sprocket wheel 43, on shaft 42, and over a coöperating sprocket wheel on shaft 39, thereby driving the conveyer 32, which, in turn, drives shaft 35, and said shaft drives conveyer 31.

In order to properly support and guide the conveyer chains and to hold their upper surfaces in a strictly horizontal plane, I provide horizontal bar 99 which is supported upon the frame beneath each conveyer, and on which the conveyer rests and along which it operates, said bar extending upwardly into the space between the side links of the chain, as clearly shown in Figs. 4 and 7, thereby not only supporting the chain but holding it to operate in a straight line.

The palmetto or palm leaf has a thick rib at its longitudinal central line and a thin rib along each of its two side edges, and consequently the leaf cannot be efficiently held or clamped for feeding between two flat unyielding surfaces since the thick longitudinal central rib of the leaf would take the entire clamping or holding pressure and hence during the action of the shredding cutters the thin parts of the leaf between its thick central and edge ribs would tend to pull out and break off. For this reason, and in order to overcome the difficulty noted, which I have found to be a serious one, I employ holding shoes 45, 46, and position the same, yieldingly above so as to coöperate respectively with the conveyer chains 31, 32. By reference to Fig. 2, it will be seen that the shoe 45, is yieldingly pressed downwardly toward the conveyer chain 31, the extreme forward end of the shoe being suitably beveled upwardly, as indicated at 47, to facilitate the introduction of the leaves between the shoe and the chain. I also provide the under side of the shoe with a downwardly projecting rib 48, which operates between the side links of the chain, see Fig. 22. This arrangement, in connection with the serration of the upper surfaces of the chain links, indicated at 33, I have found efficient in overcoming the objection and difficulty above noted, and in securing the gripping and clamping action upon the leaves to efficiently hold them during the action of the shredders so as to prevent tearing, pulling out or breaking off the slivers particularly at the thin parts of the leaves.

I have found, however, that other arrangements of equal efficiency may be employed. For instance, the conveyer chain may be provided or faced with a yielding surface with which the shoe 45, coöperates. Thus, for illustrative purposes I have shown in Fig. 23, two cotton or leather faced round belts 49, applied longitudinally between the side links of the conveyer chain, the rib 48 on the shoe depending slightly into the space between said belts. Other arrangements may be devised and still fall within the spirit and scope of my invention, the important and essential object being to secure an efficient clamping action upon the thin as well as upon the thick or rib portions of the leaves to be shredded.

The leaves are fed to the machine from the receiving table 23, being successively inserted flatwise, by hand or otherwise, under the end 47 of the shoe 45 and clamped thereby as above explained and carried by the chains past the shredding cutters.

I have found in practice that the construction and arrangement of the shredding cutters plays an important part in the success of the machine. If a series of blades are employed and assembled together in sufficient number and with the required spacial relation to sub-divide the leaf to a sufficient degree of fineness, the leaf or the shreds or slivers thereof will be cut or broken off. I have found that this result occurs when a series of knives are placed one thirty second, and even one sixteenth of an inch apart. In order to avoid this objection and difficulty I propose, in accordance with the principles of my invention, to arrange the shredding cutters in pairs of two each, as clearly indicated in Fig. 5, the blades 50, 51, being preferably curved in the direction of their rotary movement and sharpened to a knife edge 52, at their extreme ends and having their adjacent surfaces rounded and smoothed off like the sides of a needle. In addition, I prefer to bring the knife edge portions of each pair of shredding cutters into closer proximity to each other than the shanks of the cutters, as clearly shown, in order to avoid undue friction on the shredded portions of the leaf.

The cutters or shredders, arranged as above described are carried at the peripheries of carrier disks 93, in the case of the set 29, and on similar disks in the case of the sets 26 and 27. These disks are of successively increasing diameter from the feeding in end of the machine, with the result that the cutters of the first disk of set 29, will accomplish the initial shredding of a short portion only of one extreme end of the leaf, as indicated at C, Fig. 4, those of the next succeeding disk accomplishing the shredding of a somewhat greater length of the leaf, as indicated at D, Fig. 1, and so on, the cutters one disk being arranged somewhat out of the cutting plane of those of the preceding disk so as to effect a slitting action on the leaf between the slits made by the cutters of the preceding disk, as clearly shown. In this manner the leaf is sub-divided to an extent to produce shreds or to approximate fiber suitable for spinning purposes, and in a most efficient manner.

Figures 22, 23, 24:
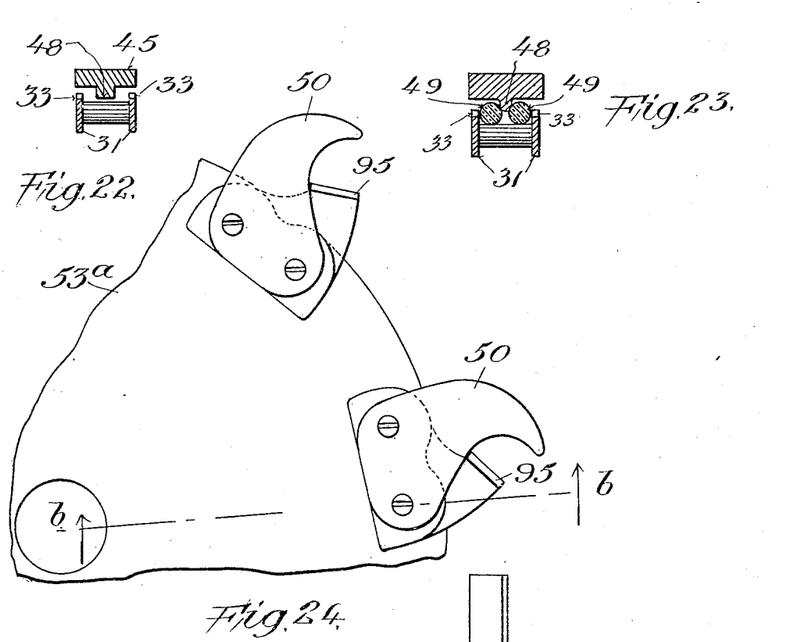
Fig. 22 is a detail view in section of the conveyer chain and coöperating shoe.
Fig. 23 is a similar view showing a modified arrangement.
Fig. 24 is a fragmentary view in side elevation showing a leaf smoothing attachment associated with the shredding cutter.
Figure 25:
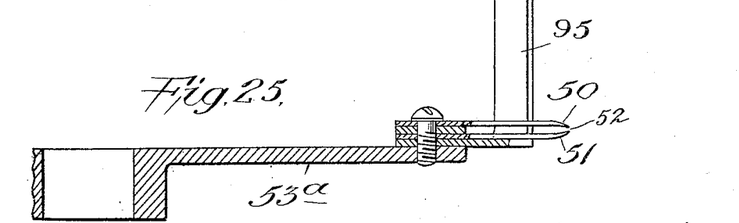
Fig. 25 is a detail view in section on the line $b$, $b$, Fig. 24.

It sometimes occurs that the edges of the leaves curl or turn up, or that the thin portion of the leaf may become broken or otherwise warped so that instead of the knife edges entering the leaf at right angles to the plane of the leaf they enter in inclined relation to such plane and consequently fail to effect a cut of uniform width of the leaf. In order to avoid this objection I provide means for smoothing out the leaf or the portion thereof operated on by the shredders, and preferably at a point immediately in advance of the cutters. This result may be accomplished in various ways. A simple arrangement is shown which I have found efficient for the purpose, and wherein I provide the cutter disks 53ª, with arms or projections 95 which are arranged to extend transversely of the leaf and are positioned somewhat in advance of the cutters. These arms or projections engage the leaf in advance of their associated cutters and smooth out the leaf against the backing or support 53. This I have found a most important feature of my invention.

While one end of the leaf is being shredded by the set of cutters 29 on one side of the conveyer 31, the similarly arranged cutters of the set 26, may be operating on the other end of the leaf, in accordance with the arrangement above described. These operations, however, still leave unshredded that portion of the leaf which is clamped by the conveyer chains and shoe. In order to accomplish the shredding of this portion of the leaves it is necessary that the partially shredded leaf be transferred to the other conveyer. This is accomplished automatically by the first conveyer 31 feeding and delivering to the second conveyer, the previously shredded portion of the leaf being gripped and clamped by the conveyer 32 and its associated shoe 46, which is constructed, mounted and associated with respect to chain 32 in like manner to the construction mounting and association of shoe 45, with reference to chain 31, as above explained. This action releases the unshredded portion of the leaf and enables the set of cutters 27 to act thereon to complete the shredding of the entire leaf, the cutters of this set having similar relation and arrangement to that above described with reference to the sets 29 and 26.

In order to prevent the cutters from tearing off, breaking or rupturing the leaves or the shreds thereof, particularly at the thin parts of the leaf, and to insure the points of the cutters penetrating through the leaf as the leaf itself is a yielding body, it is necessary to efficiently support the leaf at the points where the shredding knives enter it. This support may be afforded by a yielding surface or by a stationary surface with slight grooves to receive and permit the knife points to pass through. In practice I have found that supporting surface composed of bristles like a nail brush is efficient for the purpose, the bristles holding the leaf up to the action of the cutters and allowing the cutter blades to pass freely through them. I have found good results are attainable by employing soft metal plates suitably scored or grooved. In Fig. 4 I have shown bristle supports 53 embodying the above principles of my invention.

By the operation of the apparatus so far described the palmetto or palm or other leaves are shredded into fiber suitable for spinning into twine, and in accordance with my invention of a completely organized self contained machine for producing a complete twine product, I associate and combine with the shredding mechanism above described a spinning mechanism to which the fiber shreds are delivered for the spinning operation. I will now describe the spinning mechanism and the transferring devices for receiving the shredded fiber from the shredding mechanism and delivering the same to the spinning mechanism.

On a shaft 54, suitably journaled in the frame work is mounted what I will term a nipper wheel 55, and upon which are carried a series of nipper devices the function of which is to grip the shredded fiber in sufficient successive quantities as delivered by the shredding mechanism, draw the gripped quantities out of the shredded mass and deliver them to a twister head by which they are spun into twine. The nipper wheel 55, or its carrying shaft 54, may be driven in any suitable or convenient manner. In order to secure the advantage of timely operation of the nipper wheel and spinning apparatus with reference to the shredding mechanism, I propose to drive the nipper wheel shaft from the main shaft, and, to this end, I provide a sprocket or other form of drive gear connection 56, see Fig. 1, from shaft 28, to shaft 54, said shaft 28, being driven from the main shaft 24, in the manner above described.

The nippers devices comprise a movable nipper jaw 57, which is normally but yieldingly maintained closed upon a coöperating clamping surface 59 by means of a spring 58, engaging the shank 60 of said jaw. In order to insure an efficient grip on all the fibers which may be selected and separated and forced into the range of the nipper action notwithstanding individual fibers may vary as to their relative size or thickness, I provide the clamping surface of the nipper jaw 57 with inclined prongs 90, 91, see Fig. 13, which work through a slot in the coöperating clamping plate 59, and which form, in effect, a V shaped recess into which the selected and separated quantity of fiber is forced, as will be described hereinafter, while the jaw 57 is open. When this jaw is closed the fibers crowded into the V-shaped recess or seat and against each other are clamped against the plate 59 and efficiently held notwithstanding variations in relative sizes or thickness of individual fibers. When, during the rotation of the nipper wheel, a nipper is brought into proper relation with the shredded material delivered from the shredding mechanism, the shank 60 of the nipper jaw is brought into engaging relation with respect to a cam surface 61, by means of which said shank is rocked against the action of its spring 58, to cause the jaw 57, thereof to open to receive the fiber. When the nipper is carried beyond the cam 61 the nipper jaw again closes and grips the portion of fiber which lies between it and the surface 59. The wheel 55 revolves in a direction to cause the nippers to move downwardly through the fiber and therefore as the wheel continues its revolving movement the fiber which has been gripped by the nipper jaw are drawn longitudinally out of the mass delivered from the shredding mechanism, with the forward ends of the fiber held by the nipper, and in this relation the portion of the fiber which is thus drawn out is transported and delivered to the twister mechanism as will presently be more fully explained.

It will be observed that the shredded fiber as delivered from the shredding mechanism is held crosswise of the conveyer chains, and that the nipper wheel 55 revolves in the direction of the length of the fiber. I have found that the shredded fibers are quite yielding and therefore that it is necessary to provide means to lift them up into the V-shaped seat or recess in the jaws of the nippers. I have also found it desirable to select the quantity of fiber to go into each nipper and to divide or separate this quantity from the outcoming mass. I have shown a construction and arrangement of selector mechanism which is simple and efficient for the purpose, comprising an upwardly moving, forked member 62. This forked member may be projected upwardly through the shredded mass in timely coöperation with the nipper wheel and nippers, in any suitable or convenient manner. In practice I prefer to operate the selector member 62 by the nipper wheel itself. As illustrative of an operative arrangement for accomplishing this result, but to which of course, my invention is not to be limited or restricted, I have shown the member 62 as engaged by one arm of a bell crank lever 64, the other arm of which is engaged by a spring pressed slide 65, which is periodically moved against the action of its spring by cam projections 63 on the nipper wheel. This forked member when thus actuated, moves upwardly through the mass of shredded fibers and not only selects the required quantity thereof and separates the same from the mass, but also presses the selected and separated mass into the V-shaped seat in the nipper jaws.

Figure 3:
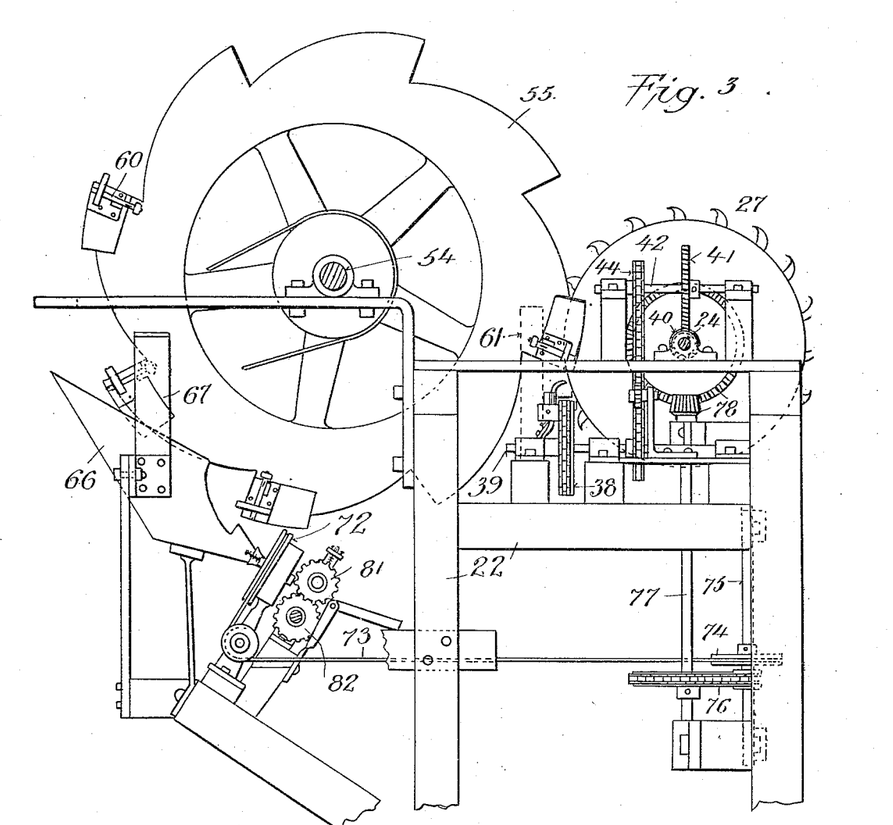
Fig. 3 is an end view of the same.
Figure 8:
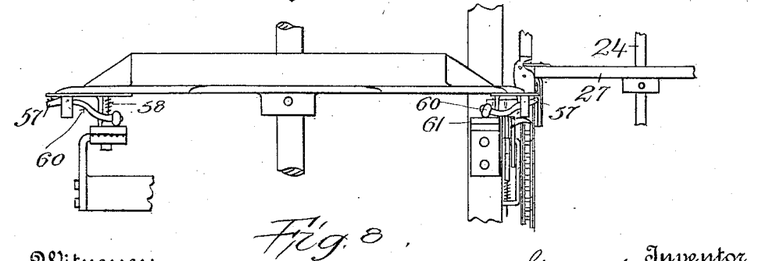
Fig. 8 is a view in top plan, parts broken off, showing the feed wheel carrying the nippers which grip and transfer the shredded fiber from the shredding to the spinning mechanisms.
Figure 9:
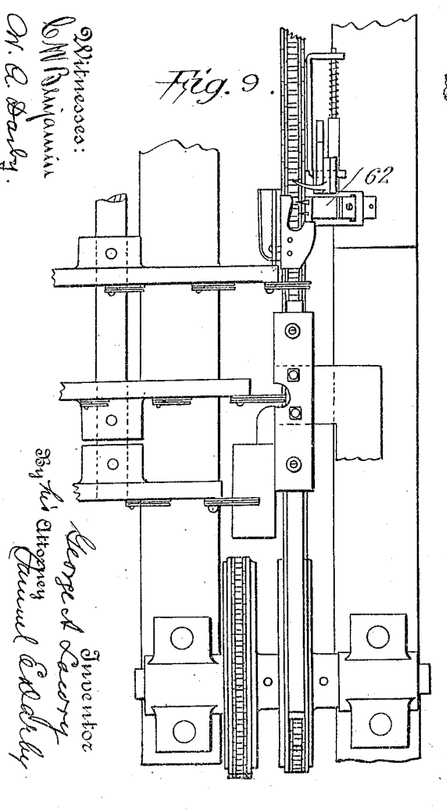
Fig. 9 is a view in top plan of a portion of the shredding mechanism, and showing the selector mechanism.

As above explained the nippers draw the selected and separated bunches or portions of fibers lengthwise from the mass, their front ends being clamped and held by the nipper jaw. At a convenient point in suitable relation to a receiving trough 66, the nipper jaws are again opened by the shank portions 60 thereof engaging a cam 67, see Fig. 3, to release the fibers. Before being released, however, the gripped ends of the fibers are carried so that the rear ends thereof which at this point in the operation depend into the trough 66, are being caught up and amalgamated into the swirl of fibers passing into the twister head. This insures the fibers being properly amalgamated into the mass which is passing into the twister head and through the rotation of which head a swirl is imparted to the mass in the hopper or trough 66. This hopper or trough is downwardly and rearwardly inclined and is funnel shaped, as shown in Fig. 3, and its rear end delivers into the mouth 69 of the twister head. This twister head 70, is journaled to revolve in a standard 71 of the machine frame, and is provided with means to impart a rapid rotation thereto, such, for example, as a pulley 72, over which operates a drive belt 73, driven from any convenient source, as a pulley 74, on a shaft 75 rotated by a sprocket gearing 76 from a shaft 77, which, in turn is driven from main shaft 24, by the gears 78. The twister head 70 carries yieldingly mounted gripper jaws 79 which lightly grip the fibers as they pass into the twister head and impart the twisting action thereto.

Figures 16, 17, 18, 19, 20:
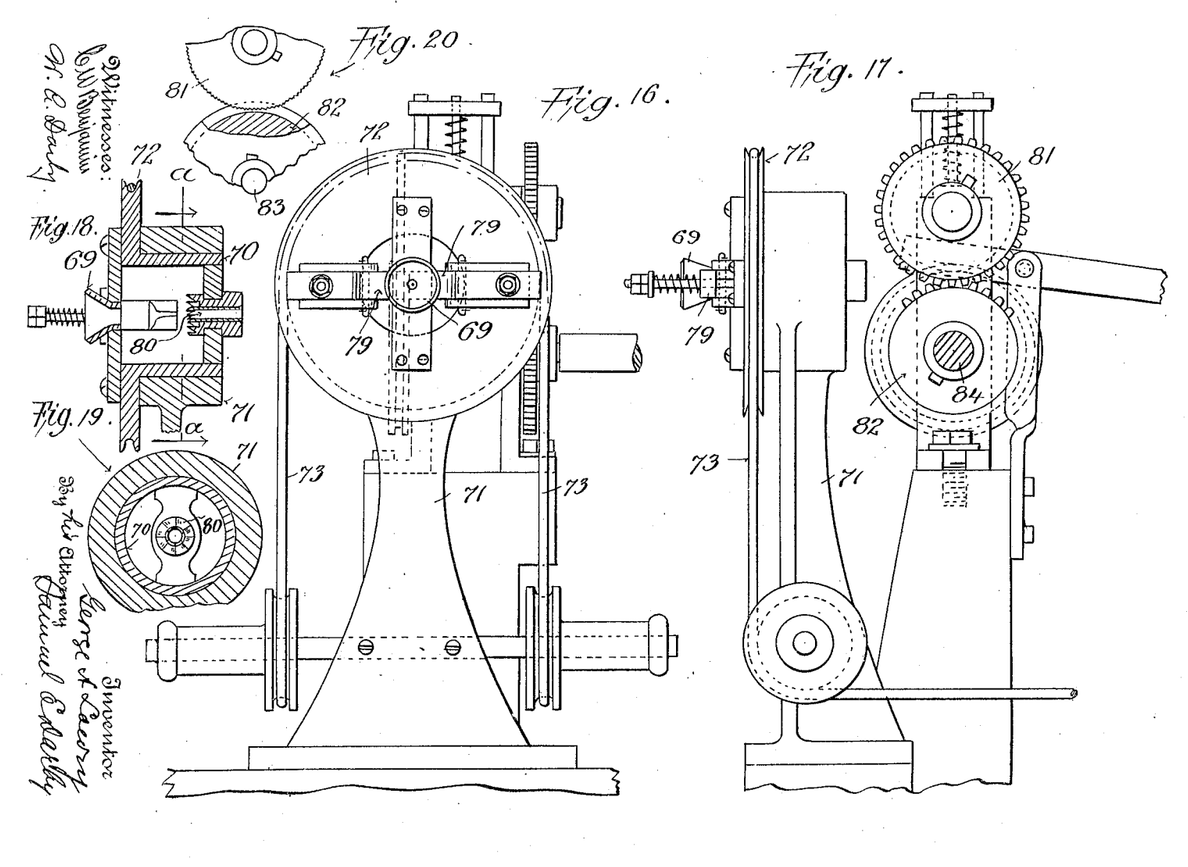
Figs. 16 and 17, are respectively, front and side elevations of the spinning and twine delivery mechanism.
Fig. 18 is a broken view in longitudinal central section through the spinning and trimming head.
Fig. 19 is a transverse section of the same on the line $a$, $a$, Fig. 18, looking in the direction of the arrows.
Fig. 20 is a broken detail view, partly in section of the twine delivery rolls.

From the twister jaws the twine passes through a cylindrical trimming cutter 80, which trims off any externally projecting ends. From the twister head and trimmer the twine passes to a draw head, which, in this instance, comprises suitably driven rolls 81, 82, between which the delivered twine is led and by which it is drawn. These rolls are driven by means of a gear connection 83, from main shaft 24, to the shaft 84, of one of said rolls. From the draw head the completed twine may be delivered to any suitable ruling mechanism or otherwise.

It will be observed that throughout the entire operation of the machine from the time the leaves are introduced until the shredded fibers are finally twisted together into twine, the fibers are always maintained in straight and parallel relation, without the necessity of employing combing or carding apparatus, and this I find a most valuable feature of an organized machine embodying my invention.

Having now set forth the objects and nature of my invention, and a construction embodying the principles thereof, I wish it to be understood that many variations and changes in the details might readily occur to persons skilled in the art and still fall within the spirit and scope of my invention as defined in the claims.

What I claim as new and useful and of my own invention and desire to secure by Letters Patent is:—

1. In a combined shredding and spinning machine, the combination of shredding devices and spinning devices, of means for feeding the material to be shredded in a horizontal path past the shredding devices, said means operating to maintain the shredded fibers in parallel relation from the beginning of the shredding operation till formed into the twine product.

2. The combination with shredding devices and means arranged to travel therepast for presenting the articles to be shredded to said devices in parallel relation to the line of action of said devices, of a spinning apparatus and means for drawing out the shredded fibers longitudinally from said presenting means for delivery to the spinning devices.

3. In a machine of the class described, the combination with shredding and spinning devices, of a conveyer and a shoe positioned above and parallel with the conveyer and having a rib presented toward the conveyer, said conveyer arranged to move past the shredding devices, and means for withdrawing the shredded fibers endwise from between the conveyer and shoe rib for presentation to the spinning devices.

4. In a machine of the class described, the combination with shredding and spinning devices, of a conveyer and a shoe yieldingly supported over and in parallel relation to the conveyer and having a rib presenting downwardly toward the conveyer, said conveyer arranged to move past the shredding devices, and means for withdrawing the shredded fibers endwise from between the conveyer and shoe rib, for presentation to the spinning devices.

5. In a machine of the class described, the combination with shredding and spinning devices, of a conveyer having a resilient surface portion, and a shoe supported above and in parallel relation to the conveyer and coöperating with the resilient surface portion thereof to grip the material to be shredded therebetween, said conveyer arranged to move past the shredding devices, and means for withdrawing the shredded fibers endwise from between the shoe and conveyer, for delivery to the spinning devices.

6. In a machine of the class described, the combination with shredding and spinning devices, of a conveyer having side portions and a shoe positioned over and in parallel relation to the conveyer, said shoe having a rib depending into the space between the side portions to grip the material to be shredded in position to be carried along by the conveyer, said conveyer arranged to move past the shredding devices, and means to withdraw the shredded fibers endwise from between the shoe and conveyer, for delivery to the spinning devices.

7. In a machine of the class described, the combination with shredding and spinning devices, of a conveyer having serrated side portions, and a shoe positioned over and in parallel relation to the conveyer, said shoe having a rib depending into the space between the serrated side portions to grip the material to be shredded in position to be carried along by the conveyer, said conveyer arranged to move past the shredding devices, and means to withdraw the shredded fibers endwise from between the shoe and conveyer, for delivery to the spinning devices.

8. In a machine of the class described, the combination with shredding devices, of a conveyer having side portions and a resilient surface intermediate said side portions, and a shoe positioned over and in parallel relation to the conveyer and having a rib coöperating with said resilient surface portion to grip the material to be shredded in position to be carried along by the conveyer, said conveyer arranged to operate past the shredding devices, and means to withdraw the shredded fibers endwise from between the shoe and conveyer.

9. In a machine of the class described, a conveyer means for retaining palmetto leaves in crosswise relation thereon, means for actuating the conveyer, cutters operating in the direction of the length of the leaves and positioned on opposite sides of the conveyer, said cutters arranged in successive series to operate through successively increasing portions of the length of the leaves, the cutters of one series being in displaced relation with respect to those of the preceding series, and means for withdrawing the shredded fibers endwise from between the retaining means and the conveyer.

10. In a machine of the class described, a conveyer means to hold a leaf to be shredded in crosswise relation thereon, cutters positioned on opposite sides of the conveyer, said cutters arranged in successive sets of increasing range of action, the cutters of one set operating between the cuts made by the cutters of the preceding set, means for moving the conveyer past said cutters, and means for withdrawing the shredded fibers endwise from the conveyer.

11. In a machine of the class described, a shredding mechanism including cutters arranged in pairs the members of each pair having their cutting points or edges in closer proximity than the shanks thereof.

12. In a machine of the class described, a shredding device including a pair of cutters each having a knife edge cutting point, and a rounded and smooth adjacent shank portion.

13. In a machine of the class described, a shredding device including a pair of cutters having their cutting edges brought into close proximity and their shanks separated.

14. In a machine of the class described and in combination with shredding devices of a conveyer operating past the shredding devices and means located alongside the conveyer for yieldingly supporting the article to be shredded at the point of action of the shredding devices.

15. In a machine of the class described, shredding devices arranged to operate on successive lengths or portions of the article to be shredded, means for feeding the article laterally past the shredding devices, and means located alongside the conveyer for yieldingly supporting the article to be shredded at the point of operation of the shredding devices.

16. In a machine of the class described, shredding devices, means for feeding the article past the shredding devices, and a yielding support for the article to be shredded located alongside the conveyer and in the path of the shredders at the point of action of the shredders.

17. In a machine of the class described, and in combination with conveyer and shredding mechanism, of a nipper device operating through the shredded material, and means for raising the shredded material into the nipper devices.

18. In a machine of the class described, and in combination with conveyer and shredding mechanisms, of nipper devices operating through the shredded mass, and means for selecting and separating portions of the shredded mass and raising the same into the nipper devices.

19. In a machine of the class described and in combination with conveyer and shredding mechanism, of a nipper wheel, nipper jaws carried thereby, means for revolving said wheel in a direction to carry said nipper jaws through the mass of shredded material, means for raising portions of the shredded fibers into the nipper jaws, and means for opening and closing said nipper jaws.

20. In a machine of the class described, and in combination with conveyer and shredding mechanism, of a nipper wheel arranged to operate in the direction of the length of the shredded material and having nipper jaws and means operating to raise a portion of the shredded material into the nipper jaws to draw the same longitudinally from the shredded mass.

21. In a machine of the class described and in combination with shredding cutters and movable carriers therefor, of means carried by said carriers for smoothing out the leaves to be shredded in advance of the action of the cutters.

22. In a machine of the class described, rotary disks, cutters carried thereby, and arms mounted on the carriers in advance of the cutters and operating to engage and smooth out the leaves to be shredded.

23. In a machine of the class described, and in combination with conveyer and shredding devices, of a support for the leaves to be shredded at the point of operation of the shredding devices, and means operating in advance of the shredding devices to smooth out the leaves.

24. In a machine of the class described, and in combination with conveyer and shredding devices, of a transfer mechanism for the shredded material including nipper jaws, and means for selecting separating and forcing the shredded material into the nipper jaws.

25. In a machine of the class described, and in combination with conveyer and shredding devices, of a nipper mechanism, including nipper jaws arranged to move through the shredded material, means for opening and closing said jaws, and a forked selector device arranged to operate through the mass of shredded material to select and separate portions thereof, and force the selected portions into the nipper jaws, and means to operate said selector device.

26. In a machine of the class described, a conveyer having side portions and a support positioned beneath said conveyer and along which the conveyer operates, said support engaging the side portions of the conveyer to form a guide therefor.

In testimony whereof I have hereunto set my hand in the presence of the subscribing witnesses, on this 4th day of March, A. D., 1914.

GEORGE A. LOWRY.

Witnesses:
W. A. DARBY,
S. E. DARBY.

Copies of this patent may be obtained for five cents each, by addressing the "Commissioner of Patents, Washington, D. C."